United States Patent [19]

Milano, Jr. et al.

[11] Patent Number: 5,779,171
[45] Date of Patent: Jul. 14, 1998

[54] OVERRIDING CLUTCH WITH REVERSE ROTATION PREVENTION SWITCH

[75] Inventors: Arthur J. Milano, Jr., Burlington; Jeffrey E. Seitz, Warren; Zoltan Sostarecz, Winsted, all of Conn.

[73] Assignee: Seitz Corporation, Torrington, Conn.

[21] Appl. No.: 643,787

[22] Filed: May 6, 1996

Related U.S. Application Data

[63] Continuation-in-part of Ser. No. 332,935, Oct. 31, 1994, abandoned.

[51] Int. Cl.$^6$ .................................................. A01K 89/02
[52] U.S. Cl. .......................... 242/299; 242/257; 242/247; 192/48.6
[58] Field of Search ............................ 242/247, 295, 242/298, 299, 257; 192/48.6, 47, 69.81

[56] References Cited

U.S. PATENT DOCUMENTS

| 776,224 | 11/1904 | Dickey | 192/69.81 |
|---|---|---|---|
| 1,941,588 | 1/1934 | Vail | 192/69.81 X |
| 3,425,527 | 2/1969 | Wolf | 192/69.81 X |
| 5,042,741 | 8/1991 | Aota | 242/247 X |
| 5,503,343 | 4/1996 | Hirano et al. | 242/247 |

FOREIGN PATENT DOCUMENTS

| 405176662 | 7/1993 | Japan | 242/257 |

*Primary Examiner*—Donald P. Walsh
*Assistant Examiner*—Emmanuel M. Marcelo
*Attorney, Agent, or Firm*—Pepe & Hazard LLP

[57] ABSTRACT

An anti-reversing mechanism for a reel comprises an overriding clutch within the drive gear of the reel, a sleeve rotatably mounted within the overriding clutch and a retainer for restricting axial movement of the sleeve to retain the sleeve within the clutch. A drive shaft is rotatably mounted in the reel and a locking member is mounted upon the periphery of and movable axially length of the drive shaft. The locking member and drive shaft include cooperating opposed flat surfaces for limiting rotation of the locking member relative to the drive shaft. The locking member and the sleeve have interengaging teeth to constrain the rotation of the locking member relative to the sleeve. In addition, there is a lever for moving the locking member axially along the drive shaft between a first position of disengagement with the sleeve and a second position of engagement with the sleeve. The engagement of the locking member permits only one-way rotation during normal torque loads, and its disengagement permits two-way rotation.

10 Claims, 3 Drawing Sheets

FIG. 1

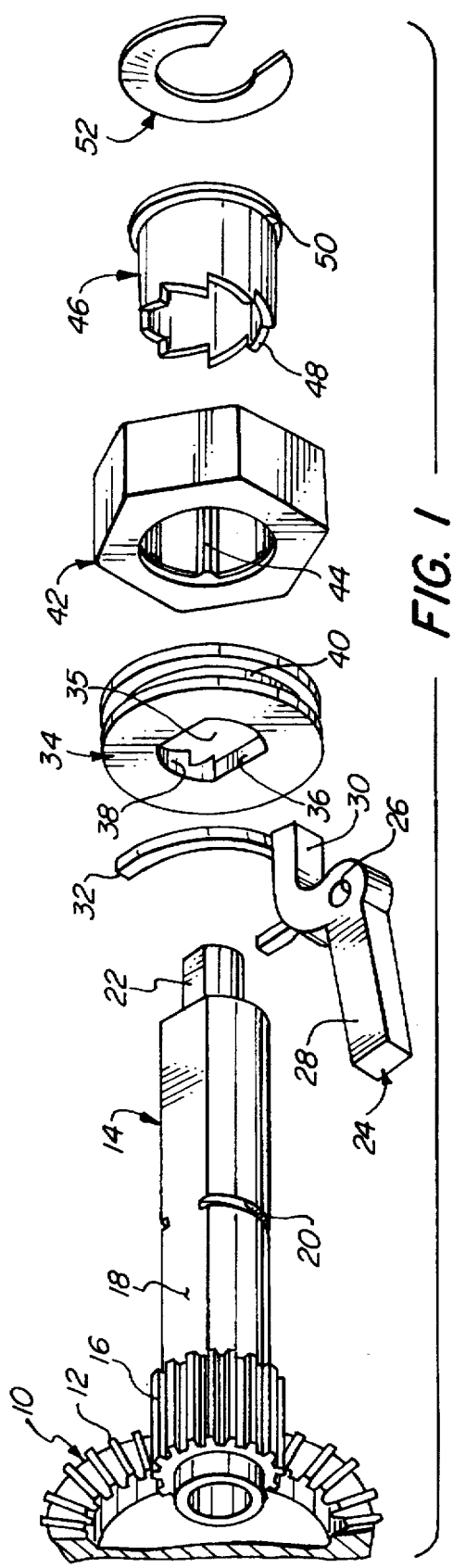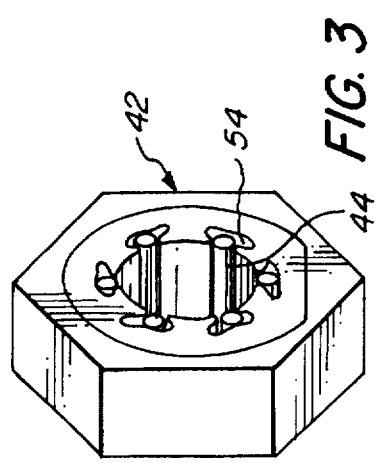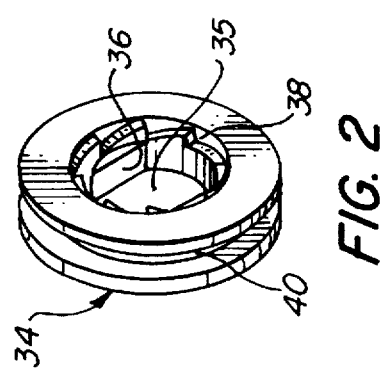

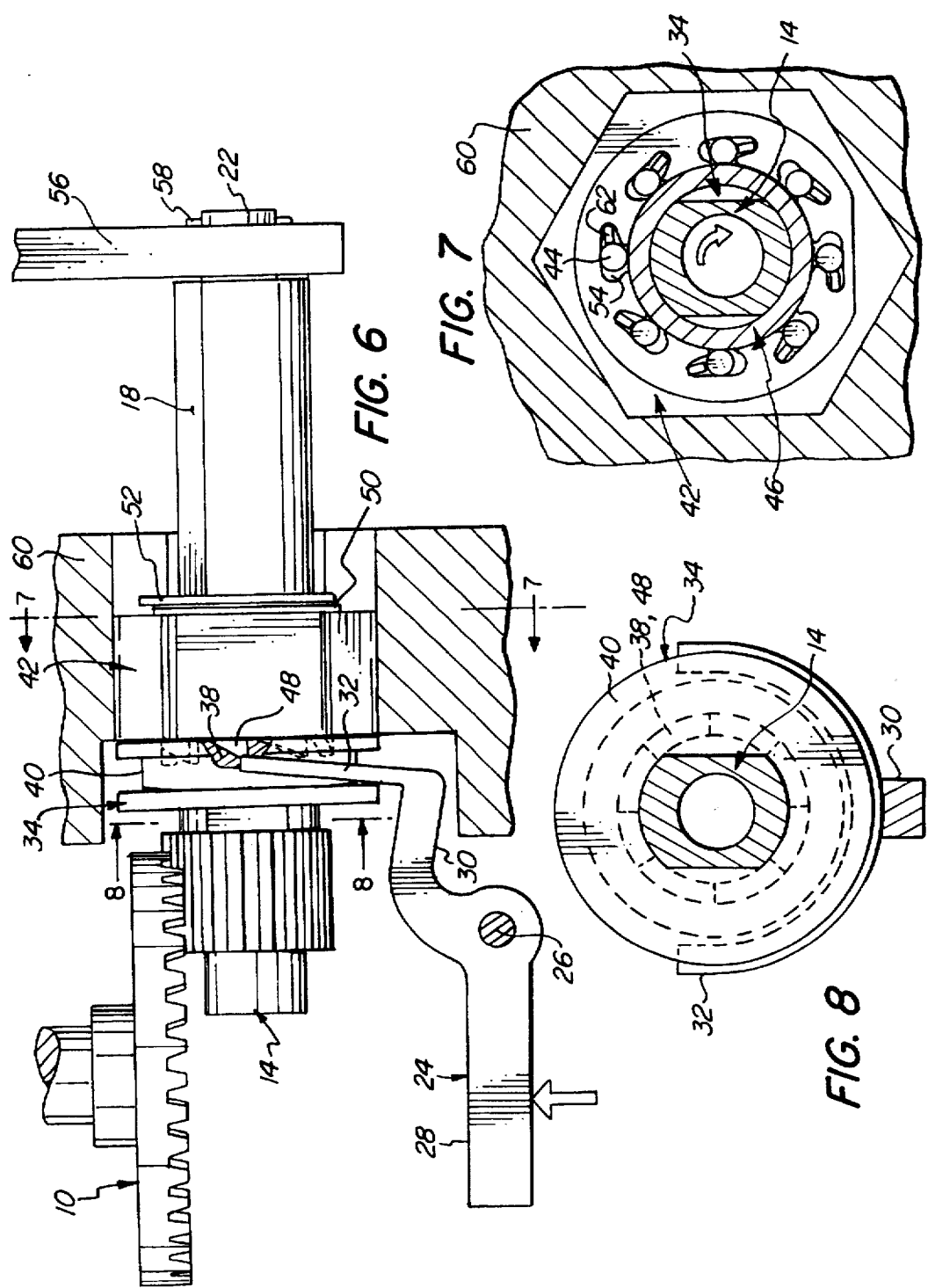

5,779,171

1

OVERRIDING CLUTCH WITH REVERSE ROTATION PREVENTION SWITCH

CROSS REFERENCE TO RELATED APPLICATION

The present application is a continuation-in-part of our application Ser. No. 08/332,935, filed Oct. 21, 1994 now abandoned.

BACKGROUND OF THE INVENTION

The present invention relates to an anti-reversing mechanism for a spinning reel such as used on fishing rods, and, more particularly, an on-off switch therefor.

Anti-reversing mechanisms for reels such as fishing and kite reels are employed to lock or prevent rotation of the spool of the reel and prevent it from being rotated by a force acting in the direction in which the line is unwound. Such mechanisms are widely employed in spinning reels used on fishing rods.

Many anti-reversing mechanisms incorporate a pawl in engagement with a toothed ratchet to prevent rotation. Exemplary of such a mechanism is Neufeld U.S. Pat. No. 4,323,203. This type of anti-reversing mechanism unfortunately is characterized by backlash, the amount of which is determined by the number of ratchet teeth. An additional drawback is that there is poor stress distribution because all the stresses retarding motion are applied to the pawl at a single point of contact. Yet another drawback to the conventional ratchet and pawl mechanism is that it does not disengage to protect the mechanism from high stresses. As a result, deformation or fracture of the ratchet and pawl mechanism is likely to occur in the event of excessive forces.

More recently, there has been proposed an anti-reversing mechanism employing an overriding clutch including a one way bearing which allows rotation in one direction but blocks rotation in the other direction. This anti-reverse mechanism eliminates the backlash associated with conventional ratchet and pawl anti-reversing mechanisms. By eliminating the backlash, it increases the angler's strike sensitivity, thereby allowing the angler to set the hook faster. In addition, an overriding clutch makes relatively minimal noise in comparison with a ratchet and pawl device. This is important to an angler since noise may be transmitted through the fishing line. Finally, the clutch can be disengaged to allow full movement in both directions unlike a ratchet and pawl mechanism. This type of anti-reversing mechanism is the subject matter of Yamaguchi U.S. Pat. No. 5,020,738. Although the Yamaguchi anti-reversing mechanism offers many advantages over prior art devices, it still connects the one-way bearing to the reel housing through a ratchet wheel and a pawl.

It is an object of the present invention to provide a novel anti-reversing mechanism for a reel which provides instantaneous lockup of the reel spool to prevent it from being undesirably rotated by a force acting in the direction in which the line is unwound.

It is also an object to provide such an anti-reversing mechanism in which backlash is eliminated and noise is minimized.

Another object is to minimize stress concentration in the anti-reversing mechanism.

A further object is to provide such a mechanism which may be fabricated relatively easily and economically.

SUMMARY OF THE INVENTION

It has now been found that the foregoing and related objects may be readily attained in an anti-reversing mechanism for a reel having a reel housing, a rotatable handle supported thereon and a drive gear incorporated in the reel housing and rotated by actuating the handle. The anti-reversing mechanism includes an overriding clutch adapted to fit within the drive gear of the fishing reel, and rotatably mounted within the overriding clutch is a sleeve. The axial movement of the sleeve is restricted by suitable means to retain the sleeve within the clutch.

Rotatably mounted in the reel housing is a drive shaft and a locking member of generally annular cross section is mounted upon the periphery of and movable axially of the drive shaft. Also included are means for limiting rotation of the locking member relative to the drive shaft, and interengaging means on the locking member and sleeve whereby rotation of the locking member is constrained by the rotation of the sleeve. In addition, there is means for moving the locking member axially along the drive shaft between a first position of disengagement with the sleeve and a second position of engagement with the sleeve. As a result, the clutch allows one-way rotation of the sleeve under normal torque loads when the locking member is engaged and two-way rotation when it is disengaged.

Preferably, the means for limiting rotation of the locking member relative to the drive shaft includes at least one flat peripheral surface portion on the drive shaft intermediate its ends and a cooperating opposed flat surface on the inner surface of the locking member. The engagement of these opposed flat surfaces prevents the rotation of the locking member relative to the drive shaft.

Generally, the interengaging member means on the locking member and the sleeve include axially extending tooth surfaces adjacent one end of the sleeve and cooperating axially extending tooth surfaces adjacent one end of the locking member. These tooth surfaces abut upon axial movement of the locking means to prevent the rotation of the locking member relative to the sleeve.

Desirably, the means for moving the locking member includes a groove extending about the circumference of the locking member and a lever adapted to be mounted in the housing of the reel. The lever has two legs extending in generally opposite directions from its fulcrum and a semicircular element attached at its center adjacent the end of one of the legs. The lever is seated in the groove, and the locking member is urged axially along the drive shaft between first and second positions when the lever is pivoted about its fulcrum. There is also means for releasably locking the lever in its first and second position.

In the preferred embodiment, the means for restricting axial movement of the sleeve has the drive shaft located within and spaced from the inner periphery of the sleeve. The drive shaft has a groove extending about its circumference adjacent the end of the sleeve opposite the interengaging means, and a retainer of generally annular cross section is disposed in the groove and extends axially outwardly of the periphery of the drive shaft to retain the sleeve within the clutch.

BRIEF DESCRIPTION OF THE DRAWINGS

FIG. 1 is an exploded view of the anti-reversing mechanism embodying the present invention together with the drive shaft and pinion gear of a reel;

FIG. 2 is a perspective view of the locking member of the anti-reversing mechanism as seen from the direction opposite that in FIG. 1;

FIG. 3 is a perspective view of the overriding clutch component;

FIG. 6 is a view similar to FIG. 4 showing the locking member engaged with the sleeve;

FIG. 7 is a sectional view along line 7—7 of FIG. 6 with the arrow showing one-way rotational movement of the drive shaft; and FIG. 8 is sectional view along line 8—8 of FIG. 6 and showing in phantom line portions of the locking member, lever and sleeve.

DETAILED DESCRIPTION OF THE PREFERRED EMBODIMENT

Figures 4, 5:
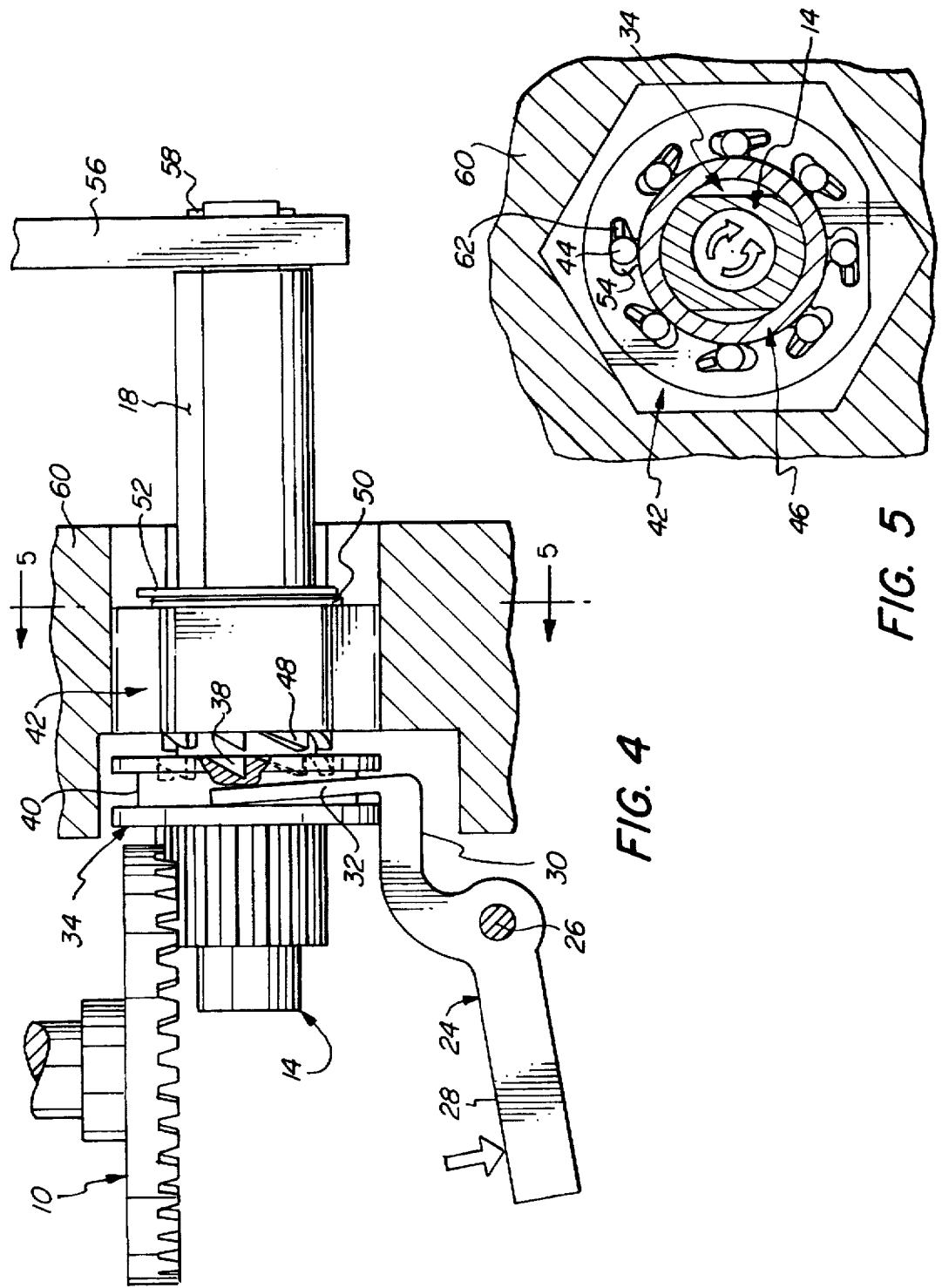
FIG. 4 is a fragmentary view in partial section as seen from the opposite direction of the anti-reversing mechanism in assembly with operative portions of the reel and showing the locking member disengaged from the sleeve.
FIG. 5 is a fragmentary sectional view along the line 5—5 of FIG. 4 with arrows showing the two-way rotational movement of the drive shaft.

Turning first to FIG. 1, an anti-reversing mechanism embodying the present invention includes a drive shaft generally designated by the numeral 14, upon which is mounted a locking member generally designated by the numeral 34. The locking member 34 is moved axially of the drive shaft 14 into and out of engagement with the sleeve generally designated by the numeral 46. A lever generally designated by the numeral 24 will move the locking member 34 into the sleeve 46 which is rotatably mounted within an overriding clutch generally designated by the numeral 42, and is retained within the overriding clutch 42 by a retainer 52.

As can best be seen in FIGS. 1 and 4, the drive shaft 14 has an elongated cylindrical body with gear teeth 16 extending thereabout adjacent one end thereof which are drivingly engaged with the teeth 12 of the face gear generally designated by the numeral 10. The face gear 10, in turn, is attached to the handle (not shown) of the fishing reel, thereby translating the rotation of the handle to rotation of the drive shaft 14. The opposite end 22 of the drive shaft 14 passes through the housing of the fishing reel 60 and is retained by a retainer 58, as best seen in FIGS. 4 and 6. In its intermediate portion, the drive shaft 14 has a pair of diametrically spaced axially extending flat surfaces 18 on its periphery and a groove 20 which extends circumferentially thereabout.

As best seen in FIGS. 1 and 2, the locking member 34 has a passage 35 extending axially therethrough with diametrically spaced flat surfaces 36 which extend over a portion of its axial length adjacent one end oppose the flat surfaces 18 on the drive shaft 14. When these opposing flat surfaces 18, 36 are disposed in abutting relationship, they prevent the rotation of the locking member 34 about the drive shaft 14. The passage 35 has a portion at the other end thereof which has a multiplicity of teeth formed thereabout. A relatively wide channel or groove 40 extends about the circumference of the locking member 34.

Turning next to the lever 24, this is best illustrated in FIG. 1 of the appended drawings. The lever 24 has a straight leg 28 and a L-shaped leg 30 extending in opposite directions from the fulcrum 26. A generally semicircular element 32 is attached at its center to the end of the leg 30 and extends at a right angle thereto. Referring to FIGS. 4 and 6, the semicircular element 32 is shown seated in the groove 40 of the locking member 34. A force applied to the leg 28, as indicated by the arrows in FIGS. 4 and 6, causes the lever 24 to pivot about its fulcrum 26. This movement is transmitted through the semicircular element 32 to the locking member 34 and causes the locking member 34 to move axially along the drive shaft 14.

As seen in FIG. 1, one end of the sleeve 46 is formed with axially extending teeth 48 which engage with teeth 38 of the locking member 34 to prevent the rotation of the sleeve 46 when they are moved into engagement.

As best seen in FIGS. 4 and 6, the sleeve 46 is rotatably mounted within the overriding clutch 42. A circumferential flange 50 on the sleeve 46 at the end opposite the teeth 48 limits movement of the sleeve 46 inwardly of the overriding clutch 42, i.e., in the direction of the locking member 34. The axial movement of the sleeve 46 in the opposite direction is limited by the retainer 52 which is seated in the groove 20 on the drive shaft 14 and against which the flange 50 abuts. Turning next to the overriding clutch 42, this is best illustrated in FIGS. 3, 5 and 7 of the appended drawings. Roller bearings 44 are disposed in equidistantly spaced bearing pockets 54 about the inner periphery of the overriding clutch 42 and are biased by leaf springs 62. As indicated by the arrow in FIG. 7, the overriding clutch 42 allows the sleeve 46 to rotate freely in one direction on the roller bearings 44. In the opposite direction, and the roller bearings 44 are wedged in their pockets 54 and provide frictional forces against the sleeve 46 and restrict rotation of the sleeve 46 under normal torque loads. In the event of excessive torque loads, the components of the overriding clutch 42 displace sufficiently to overcome the dimensional interference between the sleeve 46 and the roller bearings 44 and allow the sleeve 46 to rotate in one direction. Because all stresses are equally shared through transmission to the bearings 48 in the overriding clutch 42, there is no single point of stress contact.

As best seen in FIGS. 4 and 6, the overriding clutch 42 is adapted to fit within the housing 60 of the fishing reel and translates rotation from the handle (not shown) to the face gear 10 to the pinion gear 16 on the shaft 14 to the bail or rotor 56 of the spool (not shown) of the fishing reel.

In operation, the locking member 34 is moved between a first position in which it is disengaged from the sleeve 46 as shown in FIG. 4, and a second position in which it is engaged with the sleeve 46 as shown in FIG. 6. When the locking member 34 is disengaged from the sleeve 46, the drive shaft 14 is disengaged from the teeth 48 on the sleeve 46, and the shaft 14 is free to rotate in either direction as indicated by the arrows in FIG. 5. Since the drive shaft 14 is connected to the bail or rotor 56 of the fishing reel spool (not shown), the spool is likewise free to rotate in either direction. This condition allows the angler to cast or otherwise pay out the rotor or bail 56 of the fishing line on the spool.

Once the angler has paid out sufficient fishing line, the angler may engage the anti-reversing mechanism of the present invention by pivoting the lever 24 in the direction indicated by the arrow in FIG. 6. This movement causes the locking member 34 to move along the axis of the drive shaft 14 and urges the teeth 38 of the locking member 34 into engagement with the teeth 48 of the sleeve 46 as best seen in FIG. 6. Once the teeth 38 and 48 are fully engaged, the lever 24 may be locked into position by commonly known devices such as a spring loaded detent (not shown).

This engaged condition allows the locking member 34 to rotate freely in only the direction indicated by the arrow in FIG. 7, while the sleeve 46 can turn in only one direction inside the clutch 42 which is pressed into the reel housing 60. Under normal torque loads, the bearings 44 of the overriding clutch 42 instantaneously wedge and bear upon the sleeve 46 to prevent the drive gear 16 from rotating in the other direction. This in turn prevents the bail or rotor 56 of the spool from paying out fishing line if the drive shaft 14 is restrained from rotating.

When an excessive pulling force on the fishing line causes excessive torque on the bail or rotor 56 and thereby the drive gear 16, the overriding clutch 42 will lock in one direction. This event may typically occur when the fishing line is snagged by an obstruction on the ocean or river bed, or, less commonly, when the angler catches a really big fish. The override of the overriding clutch 42 will protect the other components of the drive mechanism from being subjected to high stresses which may result in deformation or fracture of the fishing reel mechanism.

The configuration of several components may vary from that which is illustrated in the accompanying drawings. For example, the lever may be employed to move a modified sleeve into and out of axial engagement with a locking member, whose axial movement would be restrained. Similarly, the drive shaft need not extend through the sleeve. In an alternate embodiment, the axes of the drive shaft 14 and the locking member 34 may be offset from the axis of the sleeve 46, with the locking member 34 engaging the sleeve 46 by teeth on the circumference of each.

The teeth and of the locking member and the sleeve, respectively, may be of any configuration which prevent rotational slippage when they are moved together. Moreover, the lever may be replaced by a variety of devices which would axially move either the locking member or the shaft into axial engagement with the other.

In addition, the minimizing of stresses by employing an overriding clutch enables a less durable material such a plastic to be substituted for a more durable, non-corrosive metal in components such as the locking member 34 and lever 24.

Thus, it can be seen from the foregoing detailed description and the attached drawings that the anti-reversing mechanism of the present invention provides instantaneous locking of the bail or rotor of the spool in the reel with no backlash and no rachet noise. Moreover, the anti-reversing mechanism efficiently distributes stresses through transmission of the bearings in the overriding clutch, thereby minimizing stress concentration in the anti-reversing mechanism. As a result of reducing the stresses upon the anti-reversing mechanism, relatively less durable and less expensive materials such as synthetic resin may be substituted for expensive corrosion resistant metals.

Having thus described the invention, what is claimed is:

1. An anti-reversing mechanism for a reel having a reel housing, a rotatable handle supported thereon and a drive gear of generally annular cross section within the reel housing and rotated by actuating the handle in either direction, said anti-reversing mechanism comprising:

(a) an overriding clutch of generally annular cross section adapted to fit within the drive gear of an associated reel;

(b) a sleeve of generally annular cross section rotatably mounted within said overriding clutch;

(c) means restricting axial movement of said sleeve to retain said sleeve within said clutch;

(d) a drive shaft rotatable in said sleeve and adapted to be rotatably mounted in the housing of the associated reel for rotation thereof in either direction;

(e) a locking member of generally annular cross section axially mounted upon the periphery of and movable axially of said drive shaft, said locking member including means limiting rotation of said locking member relative to said drive shaft, said locking member and said sleeve having interengaging means whereby rotation of said locking member and thereby of said shaft inone direction is constrained by the limitation of rotation of said sleeve within said overriding clutch; and (f) means for moving said locking member axially along said drive shaft between a first position of disengagement with said sleeve and a second position of engagement with said sleeve, said drive shaft and locking member being rotatable in both directions relative to said clutch when said locking member is disengaged from said sleeve, said clutch allowing one-way rotation of said sleeve and thereby said drive shaft under normal torque loads when said locking member is engaged.

2. The anti-reversing mechanism according to claim 1 wherein said means for limiting rotation of said locking member relative to said drive shaft includes at least one flat peripheral surface portion on said drive shaft intermediate its ends and a cooperating opposed flat surface on the inner surface of said locking member whereby engagement of said opposing flat surfaces prevents rotation of said locking member relative to said drive shaft.

3. The anti-reversing mechanism according to claim 1 wherein said interengaging means on said locking member and said sleeve include axially extending tooth surfaces adjacent one end of said sleeve and cooperating axially extending tooth surfaces adjacent one end of said locking member which abut upon axial movement of said locking means whereby said teeth prevent rotation of said locking member relative to said sleeve.

4. The anti-reversing mechanism according to claim 3 wherein said means for moving said locking member includes a groove extending about the circumference of said locking member, a lever adapted to be mounted in the housing of the associated reel, said lever having two legs extending in generally opposite directions from its fulcrum and a semicircular element attached at its center adjacent the end of one of said legs, said lever being seated in said groove, whereby said locking member is urged axially along said drive shaft between said first and second positions when said lever is pivoted about its fulcrum, and means for releasably locking said lever, whereby said locking member is releasably locked in one of said first and second positions.

5. A reel with an anti-reversing mechanism comprising:

(a) a reel including a reel housing;

(b) a rotatable handle supported on said reel housing;

(c) a drive gear of generally annular cross section incorporated in said reel housing and rotated by actuating said handle in either direction;

(d) an overriding clutch of generally annular cross section disposed within said housing;

(e) a sleeve of generally annular cross section rotatably mounted within said overriding clutch;

(f) means restricting axial movement of said sleeve to retain said sleeve within said clutch;

(g) a drive shaft rotatably mounted within said reel housing, and drivingly engaged with said drive gear, said drive shaft being rotatable in said sleeve in either direction;

(h) a locking member of generally annular cross section mounted upon the periphery of and movable axially of said drive shaft, said locking member including means limiting rotation of said locking member relative to said drive shaft, said locking member and said sleeve having interengaging means whereby rotation of said locking member and thereby of said shaft in one direction is constrained by the limitation of rotation of said sleeve within said overriding clutch; and (i) means for moving said locking member axially along said drive shaft between a first position of disengagement with said sleeve and a second position of engagement with said sleeve, said drive shaft and locking member being rotatable in both directions relative to such sleeve when said locking member is disengaged from said sleeve, said clutch allowing one-way rotation of said sleeve under normal torque loads when said locking member is engaged.

6. The reel with anti-reversing mechanism according to claim 5 wherein said means for limiting rotation of said locking member relative to said drive shaft includes at least one flat peripheral surface portion on said drive shaft intermediate its ends and a cooperating opposed flat surface on the inner surface of said locking member whereby engagement of said opposing flat surfaces prevents rotation of said locking member relative to said drive shaft.

7. The reel with anti-reversing mechanism according to claim 5 wherein said interengaging means on said locking member and said sleeve include axially extending tooth surfaces adjacent one end of said sleeve and cooperating axially extending tooth adjacent one end of said locking member which abut upon axial movement of said locking means whereby said teeth prevent rotation of said locking member relative to said sleeve.

8. The reel with anti-reversing mechanism according to claim 7 wherein said means for moving said locking member includes a groove extending about the circumference of said locking member, a lever mounted within said reel housing, said lever having two legs extending in generally opposite directions from its fulcrum and a semicircular element attached at its center adjacent the end of one of said legs, said lever being seated in said groove, whereby said locking member is urged axially along said drive shaft between said first and second positions when said lever is pivoted about its fulcrum, and means for releasably locking said lever, whereby said locking member is releasably locked in one of said first and second positions.

9. The reel with anti-reversing mechanism according to claim 5 wherein said means for restricting axial movement of said sleeve is provided by locating said drive shaft within and spaced from the inner periphery of said sleeve, said drive shaft having a groove extending about its circumference adjacent the end of said sleeve opposite said interengaging means, and by including a retainer of generally annular cross section disposed in said groove and extending radially outwardly of the periphery of said drive shaft thereby retaining said sleeve within said clutch.

10. An anti-reversing mechanism for a reel having a reel housing, a rotatable handle supported thereon and a drive gear of generally annular cross section within the reel housing and rotated by actuating the handle in either direction, said anti-reversing mechanism comprising:

(a) an overriding clutch of generally annular cross section adapted to fit within the drive gear of an associated reel;

(b) a sleeve of generally annular cross section rotatably mounted within said overriding clutch;

(c) means restricting axial movement of said sleeve to retain said sleeve within said clutch, said means for restricting axial movement of said sleeve being provided by (i) locating said drive shaft within and spaced from the inner periphery of said sleeve, said drive shaft having a groove extending about its circumference adjacent the end of said sleeve opposite said interengaging means, and (ii) by including a retainer of generally annular cross section disposed in said groove and extending radially outwardly of the periphery of said drive shaft to thereby retain said sleeve within said clutch;

(d) a drive shaft rotatable in said sleeve and adapted to be rotatably mounted in the housing of the associated reel for rotation thereof in either direction;

(e) a locking member of generally annular cross section axially mounted upon the periphery of and movable axially of said drive shaft, said locking member including means limiting rotation of said locking member relative to said drive shaft, said locking member and said sleeve having interengaging means whereby rotation of said locking member and thereby of said shaft in one direction is constrained by the limitation of rotation of said sleeve within said overriding clutch; and (f) means for moving said locking member axially along said drive shaft between a first position of disengagement with said sleeve and a second position of engagement with said sleeve, said drive shaft and locking member being rotatable in both directions relative to said clutch when said locking member is disengaged from said sleeve, said clutch allowing one-way rotation of said sleeve and thereby said drive shaft under normal torque loads when said locking member is engaged.

* * * * *